US012234664B1

(12) United States Patent
Simons

(10) Patent No.: US 12,234,664 B1
(45) Date of Patent: Feb. 25, 2025

(54) SYSTEMS AND METHODS FOR DRIVING A SIGN INTO THE GROUND

(71) Applicant: Tommy Simons, Abilene, TX (US)

(72) Inventor: Tommy Simons, Abilene, TX (US)

( * ) Notice: Subject to any disclaimer, the term of this patent is extended or adjusted under 35 U.S.C. 154(b) by 0 days.

(21) Appl. No.: 18/766,379

(22) Filed: Jul. 8, 2024

Related U.S. Application Data

(63) Continuation of application No. 18/652,743, filed on May 1, 2024.

(51) Int. Cl.

| | |
|---|---|
| ***B25D 1/02*** | (2006.01) |
| ***B25C 1/02*** | (2006.01) |
| ***B25D 1/16*** | (2006.01) |
| ***E04H 17/26*** | (2006.01) |

(52) U.S. Cl.
CPC ............. *E04H 17/263* (2013.01); *B25C 1/02* (2013.01); *B25D 1/16* (2013.01)

(58) Field of Classification Search
CPC .... B25C 1/00; B25C 1/02; B25D 1/00; B25D 1/12; B25D 1/16; E02D 7/04; E02D 9/02; E04H 17/263
USPC .......... 173/90, 126, 132, 1, 131, 133; 81/20, 81/22, 25; D8/14, 51, 75
See application file for complete search history.

(56) References Cited

U.S. PATENT DOCUMENTS 1,646,039 A * 10/1927 Murton ................. E04H 17/263 52/749.1
2,098,146 A * 11/1937 Hunt ..................... E04H 17/263 173/126
2,998,087 A * 8/1961 Iddings ..................... E02D 7/04 173/133
3,565,351 A * 2/1971 Ross, Jr. ............... B65F 1/1405 173/90
3,712,389 A * 1/1973 Smoak ..................... B25D 1/00 173/90
4,327,787 A * 5/1982 Loratto ................. B23B 31/113 144/195.7
4,350,192 A * 9/1982 Dent ....................... B27L 7/005 144/195.5
4,524,533 A * 6/1985 Still, Jr. .................. G09F 21/04 40/607.04
4,882,955 A * 11/1989 Savnik ..................... B25D 1/00 81/20
5,029,651 A * 7/1991 Ubbink ..................... E21B 7/26 173/90
5,248,002 A * 9/1993 Williams ................. H01R 4/66 173/90
5,605,271 A * 2/1997 Russell ..................... B25C 1/02 173/90
5,657,674 A * 8/1997 Burnett .................... B25G 1/10 81/22

(Continued)

*Primary Examiner* — Scott A Smith
(74) *Attorney, Agent, or Firm* — Jackson Walker L.L.P.

(57) ABSTRACT

A sign driver may include a hollow body configured to receive a sign. The hollow body may include a first end, a second end, which may include an opening of the hollow body, and a cutout extending from the opening along the hollow body towards the first end, where a length of the cutout is less than a length of the hollow body. The sign driver may further include a first cap fixedly attached to the hollow body substantially proximate to an end of the cutout, a second cap fixedly attached to the first end of the hollow body, and one or more handles fixedly attached to the hollow body.

18 Claims, 3 Drawing Sheets

(56) References Cited

U.S. PATENT DOCUMENTS

| | | | | |
|---|---|---|---|---|
| 6,364,031 | B1 * | 4/2002 | Amicangelo | E02D 7/04<br>173/90 |
| 6,814,738 | B2 * | 11/2004 | Naughton | A61F 2/4603<br>606/100 |
| 7,089,694 | B2 * | 8/2006 | Allen | G09F 15/0037<br>40/607.04 |
| 7,832,497 | B2 * | 11/2010 | Wilson | E04H 17/263<br>173/90 |
| 8,230,944 | B2 * | 7/2012 | Thiem | E04H 17/268<br>173/90 |
| D675,494 | S * | 2/2013 | Beem | D8/75 |
| 8,701,791 | B2 * | 4/2014 | Page | E04H 17/265<br>173/90 |
| 9,206,578 | B1 * | 12/2015 | Rose | B25D 1/16 |
| D786,031 | S * | 5/2017 | Whitten | D8/14 |
| 10,364,590 | B1 * | 7/2019 | Johnston | B25D 1/16 |
| D946,368 | S * | 3/2022 | Prior | D8/51 |
| 2005/0189129 | A1 * | 9/2005 | Rivers | E02D 7/04<br>173/90 |
| 2009/0178818 | A1 * | 7/2009 | McNeill | E04H 17/263<br>173/90 |

* cited by examiner

SYSTEMS AND METHODS FOR DRIVING A SIGN INTO THE GROUND

PRIORITY

This application is a continuation of, and claims priority to, U.S. patent application Ser. No. 18/652,743, filed on May 1, 2024, the disclosure of which is hereby incorporated by reference in its entirety.

TECHNICAL FIELD

The present disclosure relates in general to sign drivers, and more particularly to sign drivers configured to drive a sign into the ground.

BACKGROUND

Individuals and businesses often seek to communicate information to consumers, often displaying such information visually on signs for consumers to view as they pass by. For example, in the real estate context, signs in front of businesses and homes may notify the passing public that a particular piece of real estate is available for sale or lease, and may include other relevant information. Such a sign may include a panel on which text and graphics are displayed. Posts may be attached to each side of the sign, which may be driven into the ground so as to hold the sign upright. Other sign designs may be used, which generally include at least one post designed to be driven into the ground, with other members and/or panels extending from the post.

Users often experience difficulty in generating sufficient force to sufficiently drive such a sign into the ground. A user may use a hammer or mallet to drive the sign or post-portion of the sign into the ground, but such methods are often prone to user-error. For example, a user may ineffectively strike the sign or post-portion of the sign or miss altogether, which, in addition to being inefficient, may cause user injuries. Also, the user may damage the sign and/or the information contained on the sign while attempting to drive the sign into the ground. Accordingly, a sign driver for efficiently driving a sign into the ground may be desirable.

SUMMARY

In accordance with the teachings of the present disclosure, the disadvantages and problems associated with existing approaches to driving a sign into the ground are reduced or eliminated.

In accordance with embodiments of the present disclosure, a sign driver may include a hollow body configured to receive a sign, a first cap fixedly attached to the hollow body, and one or more handles fixedly attached to the hollow body. The hollow body may include a first end and a second end. The second end may include an opening, and a cutout may extend from the opening along the hollow body towards the first end.

In accordance with embodiments of the present disclosure, a method of making a sign driver may include forming a hollow body configured to receive a sign. The hollow body may include a first end and a second end. The second end may include an opening, and a cutout may extend from the opening along the hollow body towards the first end. The method may further include fixedly attaching a first cap to the hollow body, and fixedly attaching one or more handles to the hollow body.

In accordance with embodiments of the present disclosure, a sign driver may include a hollow body configured to receive a sign. The hollow body may include a first end, a second end, which may include an opening of the hollow body, and a cutout extending from the opening along the hollow body towards the first end, where a length of the cutout is less than a length of the hollow body. The sign driver may further include a first cap fixedly attached to the hollow body substantially proximate to an end of the cutout, a second cap fixedly attached to the first end of the hollow body, and one or more handles fixedly attached to the hollow body.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
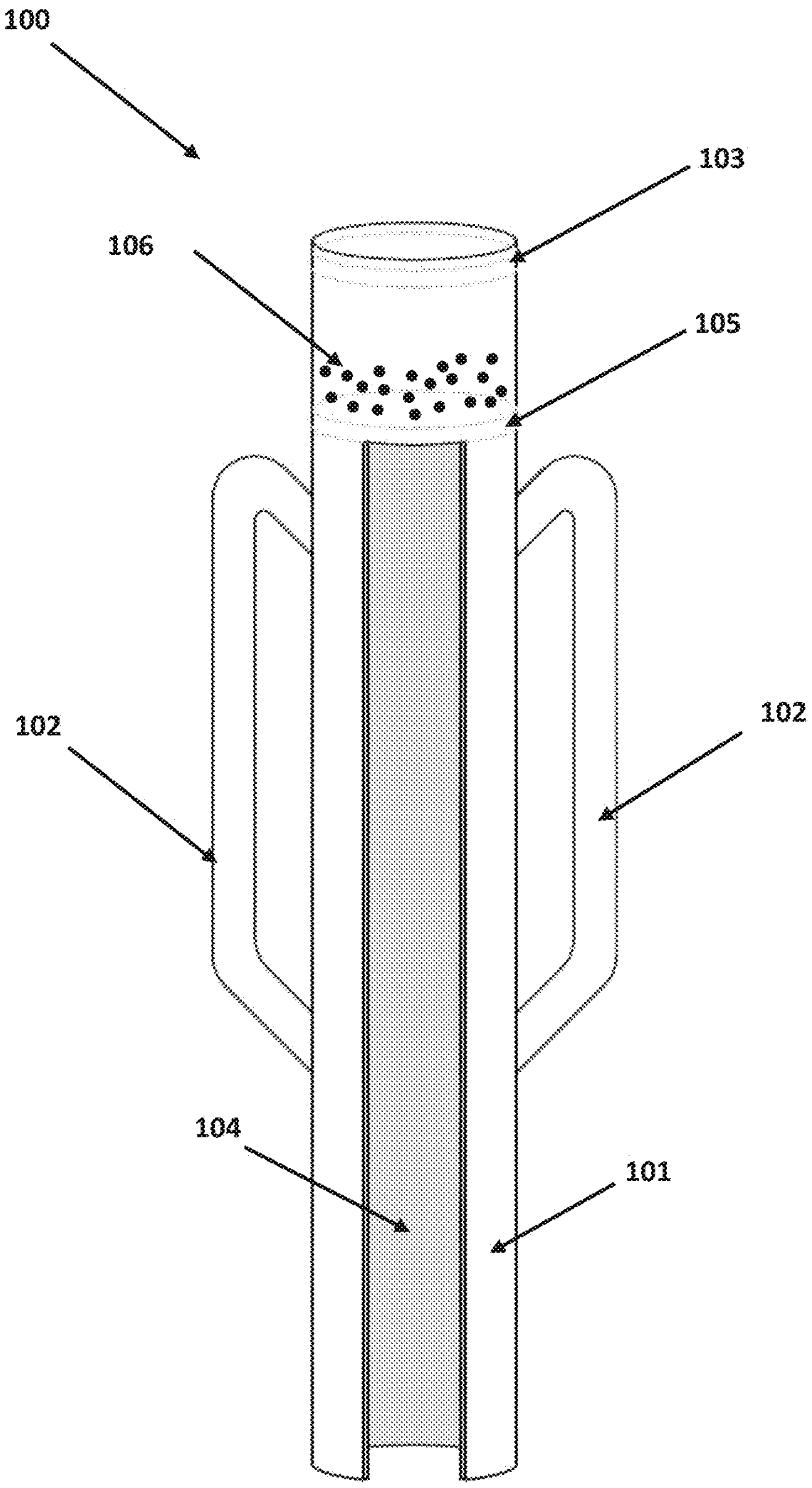
FIG. 1 illustrates a front perspective view of an example sign driver, in accordance with embodiments of the present disclosure.
Figure 2A:
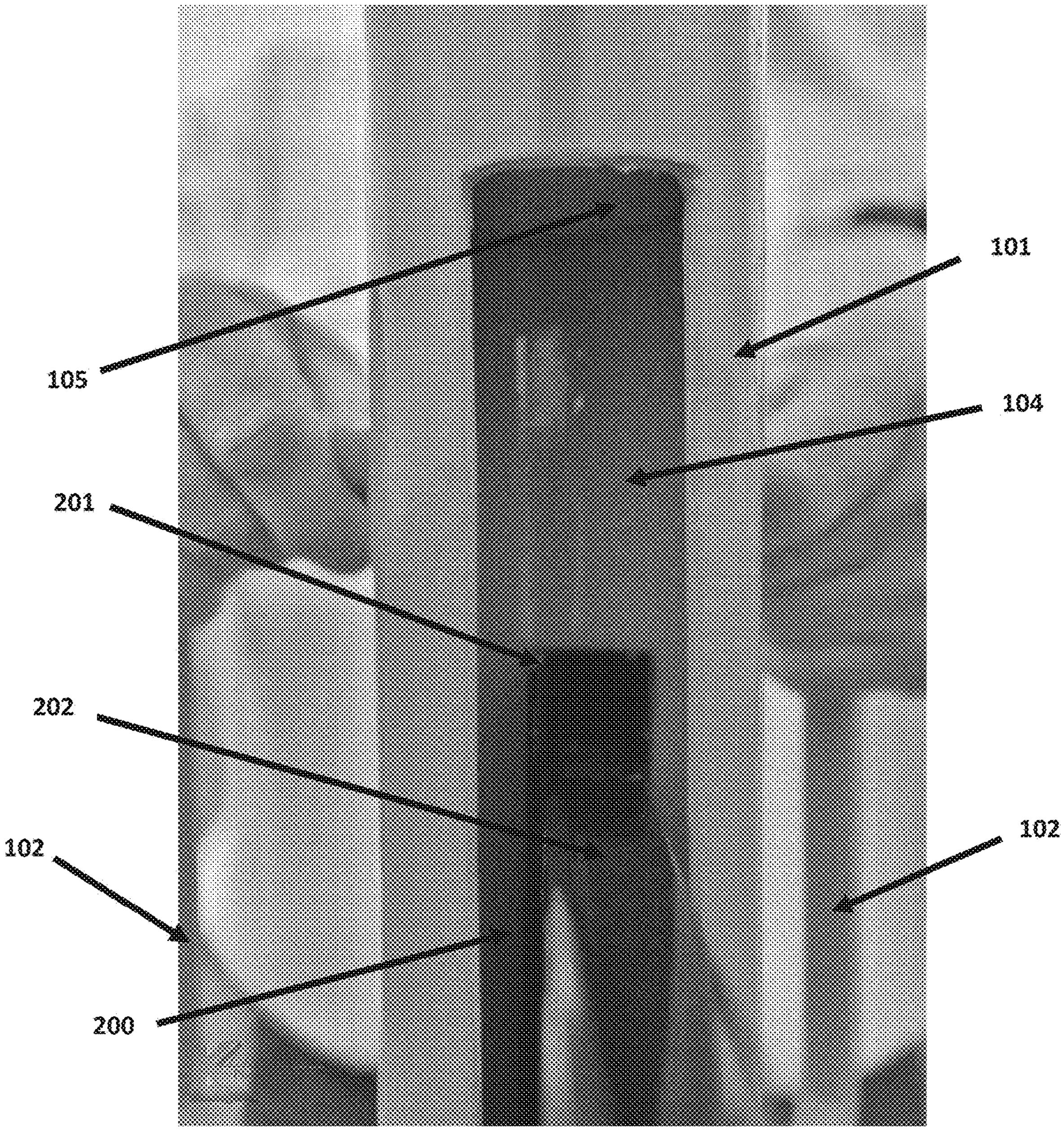
FIGS. 2A-2B illustrate various perspective views of selected components of the example sign driver of FIG. 1, including an example sign inserted within the example sign driver, in accordance with embodiments of the present disclosure.
Figure 2B:
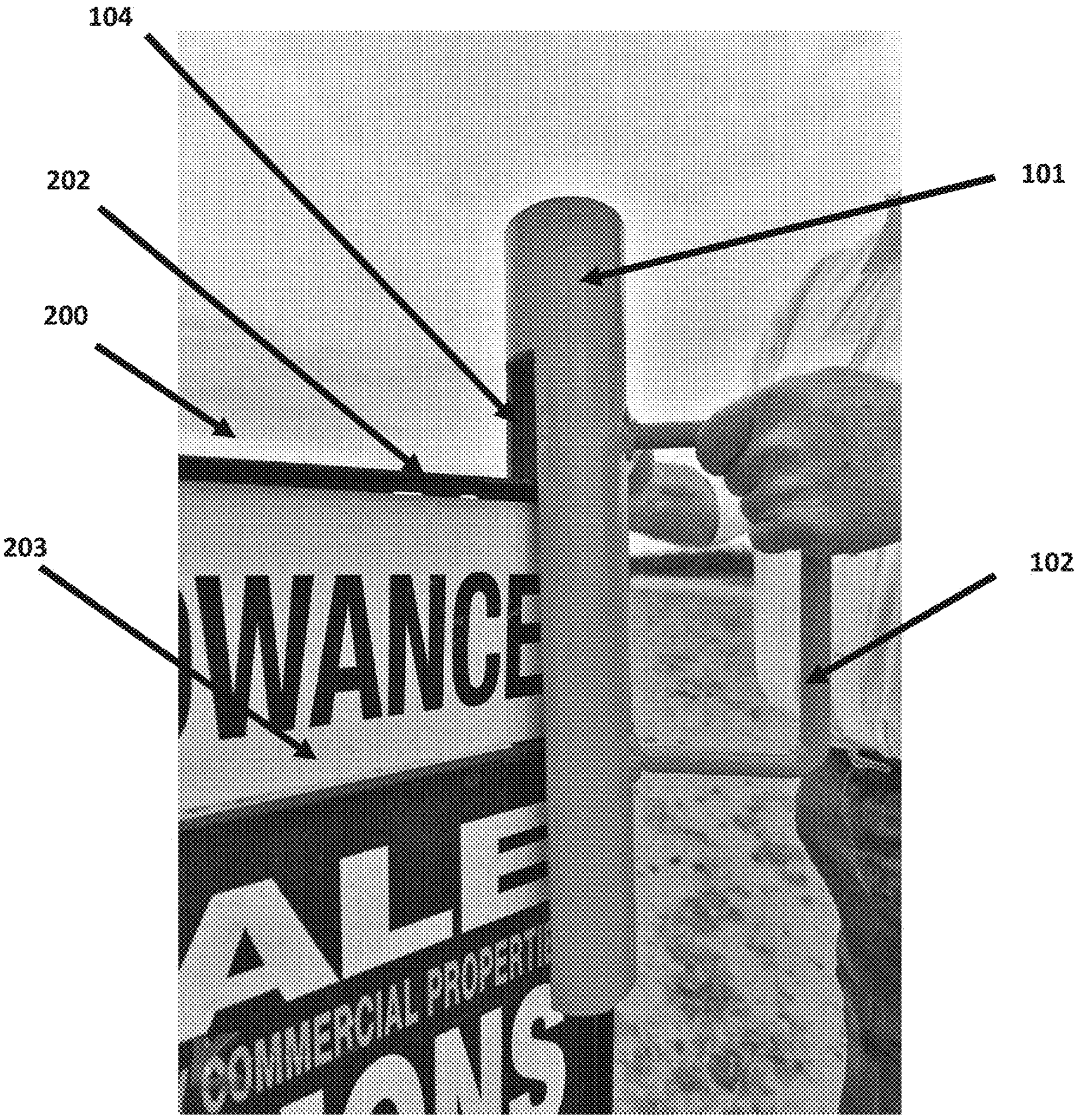

Preferred embodiments and their advantages are best understood by reference to FIGS. 1 through 2B, wherein like numbers are used to indicate like and corresponding parts.

The following detailed description discloses subject matter with reference to illustrative examples including examples illustrated in the drawings. It should, however, be apparent to persons of ordinary skill in the field that the disclosed examples are illustrative and not exhaustive.

Referring now to the drawings, FIG. 1 illustrates a front perspective view of an example sign driver 100, in accordance with embodiments of the present disclosure. As shown in FIG. 1, sign driver 100 may comprise a main body 101 and one or more handles 102.

In some embodiments, main body 101 may be substantially cylindrical in shape (e.g., a right circular cylinder shape) and may be hollow inside. Main body 101 may comprise a cap 103 fixedly attached to a first end of main body 101, while a second end of main body 101 may be open. A "front" side of main body 101 may comprise a cutout 104 extending from the open end of main body 101 towards the first end of main body 101. In some embodiments, cutout 104 may have a length less than that of main body 101, and may comprise a substantial length of main body 101. In some embodiments, main body 101 may further comprise a cap 105 fixedly attached inside of and to main body 101 substantially proximate to a "top" edge of cutout 104 (e.g., cap 105 may be substantially flush with the top edge of cutout 104). As described in further detail below, a width of cutout 104 may be such that a sign may be inserted into main body 101. In some embodiments, a space between cap 103 and cap 105 may be partially filled with loose particles 106 (e.g., steel shot, lead shot, sand) to act as a dead-blow hammer and to reduce energy transmitted back to a user during use of sign driver 100 (e.g., loose particles 106 may move during operation of sign driver 100 such that energy generated when sign driver 100 strikes the sign is absorbed, reducing force after impact). A surface of cap 105 (e.g., a surface of cap 105 that contacts the post during use of sign driver 100) may comprise a suitable coating or cover (e.g., rubber, polyurethane) to reduce and/or prevent damage to the post.

As further shown in FIG. 1, one or more handles 102 may be fixedly attached to a "rear" side of main body 101. In some embodiments, handles 102 may comprise a pipe and may be substantially C-shaped. In some embodiments, handles 102 may be hollow, while in other embodiments handles 102 may be solid. As described in further detail below, handles 102 may be configured to provide a sufficient grip point for a user to manipulate sign driver 100 to drive a sign into a surface (e.g., the ground). In some embodiments, main body 101, cap 103, cap 105, and handles 102 may comprise a material sturdy enough to drive a sign into the ground (e.g., a metal such as steel).

While FIG. 1 shows sign driver 100 comprising two handles 102, one of ordinary skill in the art may understand that sign driver 100 may comprise any suitable number of handles 102 arranged in any suitable configuration to facilitate operation of sign driver 100. While FIG. 1 shows main body 101 comprising a substantially cylindrical shape and cutout 104 comprising a substantially rectangular shape, one of ordinary skill in the art may understand that main body 101 and cutout 104 may comprise any suitable shapes such that a sign may be inserted in to main body 101.

In one embodiment, main body 101 may comprise a cylindrical shape approximately 18" in length and 3" in diameter. Cap 103 may be fixedly attached to the first end of main body 101, and may be approximately ⅛" thick and 3" in diameter. The second end of main body 101 may be open. A "front" side of main body 101 may comprise cutout 104, which may be approximately 1¾" wide and extend approximately 15" in length from the second end of main body 101 towards the first end of main body 101 (e.g., a "top" edge of cutout 104 may be approximately 3" below the first end of main body 101). Main body 101 may further comprise cap 105 fixedly attached inside of and to main body 101 and substantially proximate to the top edge of cutout 104 (e.g., second cap 105 may be substantially flush with the top edge of cutout 104). Cap 105 may be approximately ⅛" thick and 3" in diameter.

In this embodiment, two handles 102 may be fixedly attached to a "rear" side of main body 101 approximately 4½" from the first end of main body 101, and may be spaced approximately 2" apart from each other. A handle 102 may comprise a ⅝" thick solid pipe and may be substantially C-shaped. Handle 102 may comprise a first long portion, approximately 8¼" in length, a second short portion extending perpendicular from a first end of the first long portion, and a third short portion extending perpendicular from a second end of the first long portion, where the second short portion and third short portion are both approximately 4½" in length.

While the terms "front," "rear," "top," and "bottom" are used for purposes of exposition and clarity, such terms are not intended to limit sign driver 100 to a particular orientation or configuration.

FIGS. 2A-2B illustrate various perspective views of selected components of sign driver 100 of FIG. 1, including an example sign 200 inserted within sign driver 100, in accordance with embodiments of the present disclosure. As shown in FIGS. 2A-2B, sign 200 may comprise a post 201, a member 202 extending therefrom, and a panel 203 fixedly attached to member 202 and post 201. While not shown in FIGS. 2A-2B, member 202 may fixedly attach post 201 to an opposite post to which panel 203 may also be fixedly attached.

As shown in FIGS. 2A-2B, a width of cutout 104 may be such that a user may insert sign 200 or any element thereof within sign driver 100. In operation, a user may use handles 102 to move sign driver 100 up such that there is space between cap 105 and sign 200. A user may then use handles 102 to move sign driver 100 down until cap 105 comes into contact with sign 200 or any element thereof, driving sign 200 into a surface beneath it (e.g., the ground). A user may continue to utilize sign driver 100 in such a manner to exert sufficient force on sign 200 or any element thereof to drive sign 200 into the surface beneath it (e.g., the ground). As described above, a space between cap 103 and cap 105 may be partially filled with loose particles 106 (e.g., steel shot, lead shot, sand) to reduce energy transmitted back to a user during use of sign driver 100 (e.g., loose particles 106 may move when sign driver 100 is in operation such that energy generated during the strike is absorbed, reducing force after impact).

While FIGS. 2A-2B shows sign driver 100 accommodating (e.g., capable of fitting inside of it) sign 200, where sign 200 comprises post 201, member 202 extending therefrom, and panel 203 fixedly attached to post 201 and member 202, one of ordinary skill in the art would understand that sign driver 100 may accommodate signs having a variety of post and/or panel configurations. For example, sign driver 100 may accommodate signs having a post sufficiently flush with a member extending therefrom, as well as signs lacking a member but having a panel extending from a post. One of ordinary skill in the art would further understand that sign driver 100 may, when in use, come into contact with various portions of a sign (e.g., a post, a member extending therefrom, a panel), whether alone or in combination.

Although the foregoing contemplates using sign driver 100 to drive a sign into the ground, sign driver 100 as disclosed herein may be used in any other suitable application in which it is desired to mechanically drive an item into the ground.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicant wishes to note that it does not intend any of the appended claims or claim elements to invoke 35 U.S.C. § 112(f) unless the words "means for" or "step for" are explicitly used in the particular claim.

What is claimed is:

1. A sign driver comprising:

a hollow body configured to receive a sign that includes two vertical members connected by a horizontal member, the hollow body comprising:

a first end;

a second end, wherein the second end comprises an opening of the hollow body; and a cutout extending from the opening along the hollow body towards the first end, wherein the cutout includes two parallel sides terminating at right angles into a perpendicular side;

a first cap fixedly attached to the hollow body, wherein a surface of the first cap is substantially coplanar with the perpendicular side of the cutout; and one or more handles fixedly attached to the hollow body.

2. The sign driver of claim 1, wherein the hollow body is cylindrical in shape.

3. The sign driver of claim 1, wherein the surface of the first cap is covered by an absorptive material configured to reduce damage to the sign when the first cap contacts the sign.

4. The sign driver of claim 1, wherein a width of the cutout is such that the sign is insertable within the hollow body.

5. The sign driver of claim 1, wherein a length of the cutout is less than a length of the hollow body.

6. The sign driver of claim 1, further comprising a second cap fixedly attached to the first end of the hollow body such that the first cap is fixedly attached to the hollow body between the second cap and the second end.

7. The sign driver of claim 6, wherein a space between the first cap and the second cap is partially filled with loose particles.

8. The sign driver of claim 1, wherein the sign driver is metal.

9. A method of making a sign driver comprising:

forming a hollow body configured to receive a sign that includes two vertical members connected by a horizontal member, the hollow body comprising:

a first end;

a second end, wherein the second end comprises an opening; and a cutout extending from the opening along the hollow body towards the first end, wherein the cutout includes two parallel sides terminating at right angles into a perpendicular side;

fixedly attaching a first cap to the hollow body, wherein a surface of the first cap is substantially coplanar with the perpendicular side of the cutout; and fixedly attaching one or more handles to the hollow body.

10. The method of claim 9, wherein the hollow body is formed into a cylindrical shape.

11. The method of claim 9, wherein a width of the cutout is formed such that the sign is insertable within the sign driver.

12. The method of claim 9, wherein a length of the cutout is formed to be less than a length of the hollow body.

13. The method of claim 9, further comprising fixedly attaching a second cap to the first end of the hollow body such that the first cap is fixedly attached to the hollow body between the second cap and the second end.

14. A sign driver comprising:

a hollow body configured to receive a sign that includes two vertical members connected by a horizontal member, the hollow body comprising:

a first end;

a second end, wherein the second end comprises an opening of the hollow body;

a cutout extending from the opening along the hollow body towards the first end, wherein a length of the cutout is less than a length of the hollow body, and wherein the cutout includes two parallel sides terminating at right angles into a perpendicular side;

a first cap fixedly attached to the hollow body, wherein a surface of the first cap is substantially coplanar with the perpendicular side of the cutout;

a second cap fixedly attached to the first end of the hollow body; and one or more handles fixedly attached to the hollow body.

15. The sign driver of claim 14, wherein the hollow body is cylindrical in shape.

16. The sign driver of claim 14, wherein a width of the cutout is such that the sign is insertable within the hollow body.

17. The sign driver of claim 14, wherein the surface of the first cap is covered by an absorptive material configured to reduce damage to the sign when the first cap contacts the sign.

18. The sign driver of claim 14, wherein a space between the first cap and the second cap is partially filled with loose particles.

* * * * *